US011601577B1

(12) United States Patent
Quinn et al.

(10) Patent No.: US 11,601,577 B1
(45) Date of Patent: Mar. 7, 2023

(54) OPTICS ATTACHMENT APPARATUS, SYSTEMS, AND METHODS

(71) Applicant: Full Frame Outdoors LLC, Boise, ID (US)

(72) Inventors: Keaton Cody Quinn, Boise, ID (US); Jennifer Irene Mehrhoff, Boise, ID (US)

(73) Assignee: Full Frame Outdoors LLC, Boise, ID (US)

( * ) Notice: Subject to any disclaimer, the term of this patent is extended or adjusted under 35 U.S.C. 154(b) by 0 days.

(21) Appl. No.: 17/892,468

(22) Filed: Aug. 22, 2022

Related U.S. Application Data

(60) Provisional application No. 63/248,889, filed on Sep. 27, 2021.

(51) Int. Cl.
*H04N 5/225* (2006.01)

(52) U.S. Cl.
CPC ......... *H04N 5/2254* (2013.01); *H04N 5/2257* (2013.01)

(58) Field of Classification Search
CPC .................................................. H04N 5/2254
USPC .......................................................... 348/335
See application file for complete search history.

(56) References Cited

FOREIGN PATENT DOCUMENTS

CN 209446869 * 9/2019

* cited by examiner

*Primary Examiner* — Joel W Fosselman
(74) *Attorney, Agent, or Firm* — Parsons Behle & Latimer

(57) ABSTRACT

The disclosure is generally related to an apparatus is configured to mount an optical device to a phone and align the optical device with the camera of the phone. The apparatus includes a first body having an arcuate shape, the first body having an inner side, an outer side, a top, a bottom, a first end, and a second end. The bottom includes a first recess and a second recess positioned within the first recess. The apparatus includes a second body connected to the inner side of the first body. The second body is movable inwards and outwards with respect to the inner side of the first body. The apparatus includes a strap connected to the first body to connect an optical device. The apparatus includes a magnet positioned within the second recess. The magnet connects the apparatus to a ferrous element connected to the back of phone.

20 Claims, 7 Drawing Sheets

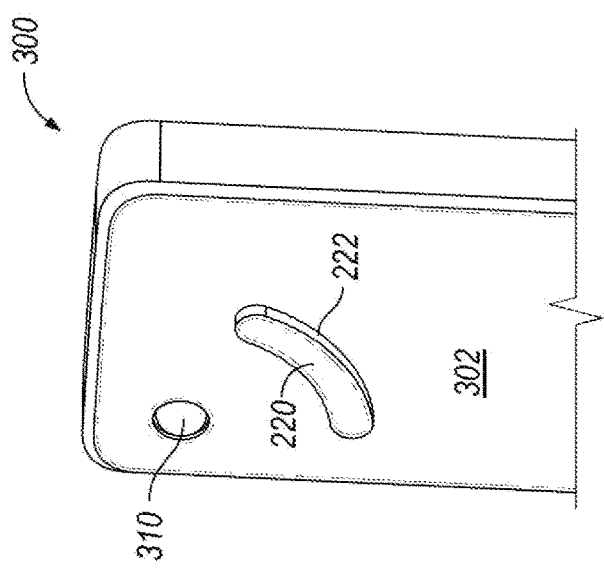
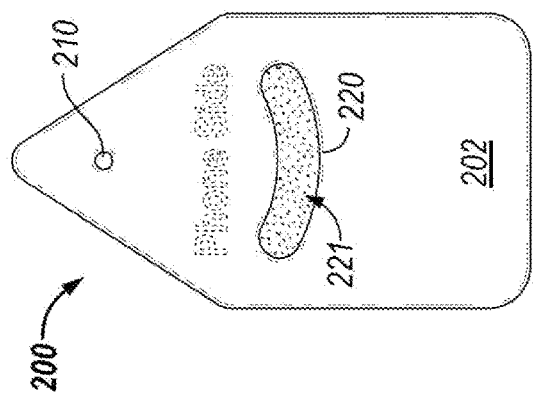
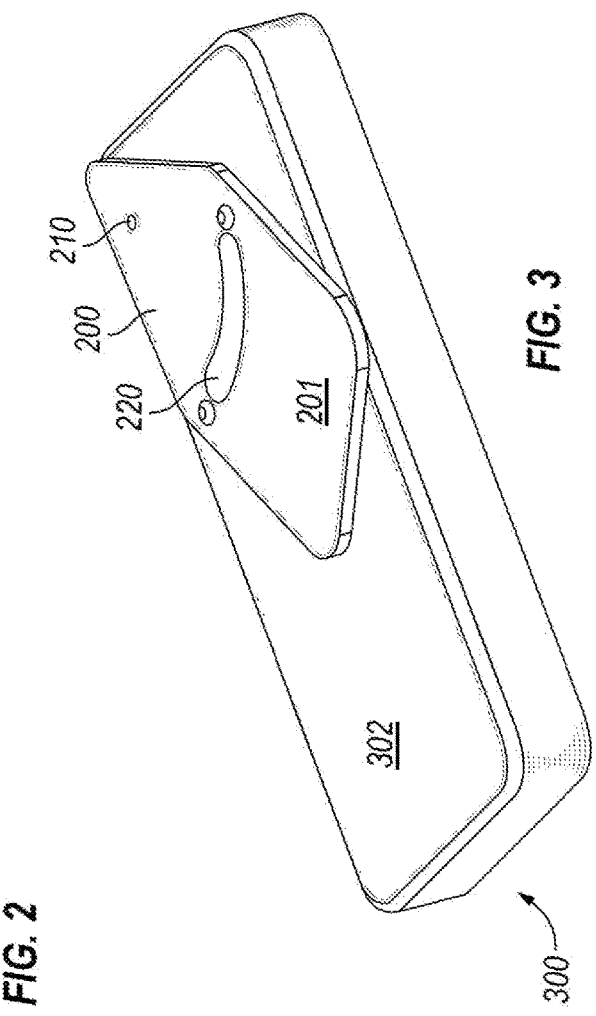

OPTICS ATTACHMENT APPARATUS, SYSTEMS, AND METHODS

RELATED APPLICATION

This application claims the benefit of priority under 35 U.S.C. § 119 to U.S. Provisional Patent Application Ser. No. 63/248,889 entitled "OPTICS ATTACHMENT APPARATUS, SYSTEMS, AND METHODS" filed on Sep. 27, 2021, which is incorporated herein in its entirety.

FIELD OF THE DISCLOSURE

This disclosure is generally related to apparatus, systems, and methods to connect an optical device to a mobile phone and align the optical device to the camera of the mobile phone.

BACKGROUND

Individuals in the outdoor industry have experiences that are far beyond that of the average person. Often, it may be difficult to convey the beauty of nature's creations and instances to someone who is not familiar to these remote and undisturbed locations. Luckily, modern technological advancements in the form of smart phones and smaller portable camera systems such as GoPro and the like have somewhat helped bridge the gap of explaining scenarios and capturing moments for people to bring back to share. Sometimes, high-end optics help these individuals witness these moments in minute detail, and traditionally it is difficult to line up camera-like equipment to capture these moments with magnifying optics due to the critical alignment of camera lens to eyepiece, specific eye relief, and portability. Other disadvantages may exist.

SUMMARY

The disclosure is generally related to an apparatus configured to mount an optical device to a phone and align the optical device with the camera of the phone.

One embodiment of the present disclosure is an apparatus comprising a first body having an arcuate shape, the first body having an inner side, an outer side opposite the inner side, a top, and a bottom opposite of the top, a first end, and a second end opposite of the first end, the bottom including a first recess and a second recess positioned within the first recess. The apparatus includes a second body connected to the inner side of the first body, wherein the second body is configured to be movable inwards and outwards with respect to the inner side of the first body. The apparatus includes a strap having a first portion selectively connected to the first body and a second portion selectively connected to the first body, the strap forming an arc from the inner side of the first body, wherein a radius of the arc may be adjusted by second portion selectively connected to the first body. The apparatus includes a magnet positioned within the second recess.

The apparatus may include a third recess positioned within the first recess and a second magnet positioned within the third recess. The apparatus may include a fourth recess positioned within the first recess and a third magnet positioned within the fourth recess. A portion of the second body may have an arcuate shape.

The apparatus may include a first post that extends from the second body toward the first body. The apparatus may include a second post that extends from the second body shape toward the first body. The apparatus may include a central aperture that extends through the first body from the inner side to the outer side. The apparatus may include a first aperture that extends through the first body from the inner side to the outer side. The apparatus may include a second aperture that extends through the first body from the inner side to the outer side. The central aperture may be positioned between the first aperture and the second aperture. A portion of the first post of the second body may be positioned with the first aperture of the first body. A portion of the second post of the second body may be positioned within the second aperture of the first body.

The apparatus may include a screw connected to the second body, the screw being positioned within the central aperture of the first body, wherein rotation of the screw adjusts the position of the second body relative to the inner side of the first body. The apparatus may include a fifth recess located in the top of the first body. The apparatus may include a hex key positioned within the first recess and wherein the hex key is configured to rotate the screw.

The apparatus may include a post that extends from the second body toward the first body. The apparatus may include a central aperture that extends through the first body from the inner side to the outer side. The apparatus may include a first slot connected to the central aperture. The first slot that extends through at least a portion of the first body. The apparatus may include a second slot connected to the central aperture. The second slot extends through at least a portion of the first body. The central aperture may be positioned between the first slot and the second slot. A central portion of the post of the second body may be positioned within the central aperture of the first body. A first portion of the post of the second body may be positioned within the first slot. A second portion of the post of the second body may be positioned within the second slot. The apparatus may include a screw connected to the second body, the screw being positioned within the central aperture of the first body, wherein rotation of the screw adjusts the position of the second body relative to the inner side of the first body.

The apparatus may include an exterior post positioned on the second end of the first body and the strap further comprising a plurality of holes along a length of the strap, wherein the second portion of the strap is connected to the first body via the exterior post positioned within one of the plurality of holes. A first portion of the strap may pass through a first portion of the first body and a second portion of the strap may pass through a second portion of the first body. A first portion of the strap may pass around a first portion of the first body and a second portion of the strap may pass around a second portion of the first body.

One embodiment of the present disclosure may be a system. The system comprises an alignment tool having a top surface and a bottom surface opposite the top surface. The alignment tool includes an alignment aperture through the alignment tool and a ferrous arc selectively connected to the bottom surface. The system includes an adhesive connected to the ferrous arc opposite of the alignment tool. The system includes a first body having an arcuate shape, the first body having an inner side, an outer side opposite the inner side, a top, and a bottom opposite of the top, a first end, and a second end opposite of the first end, the bottom including a first recess and a second recess positioned within the first recess. The system includes a second body connected to the inner side of the first body, wherein the second body is configured to be movable inwards and outwards with respect to the inner side of the first body. The system includes a strap having a first portion selectively connected to the first body and a second portion selectively connected to the body, the strap forming an arc from the inner side of the first body, wherein a radius of the arc may be adjusted by second portion selectively connected to the first body. The system includes a magnet positioned within the second recess. The alignment tool may be used to connect the ferrous arc to a phone and may be used to align the ferrous arc with respect to a camera of the phone.

The system may include a third recess positioned within the first recess, a second magnet positioned within the third recess, a fourth recess positioned within the first recess, and a third magnet positioned within the fourth recess. The second body may have an arcuate shape and may include a post that extends from the arcuate shape toward the first body. The first body may include a central aperture that extends through the first body from the inner side to the outer side and a portion of the post of the second body may be positioned with the central aperture of the first body. The system may include a screw connected to the second body, the screw being positioned within the central aperture of the first body, wherein rotation of the screw adjusts the position of the second body relative to the inner side of the first body.

One embodiment of the present disclosure is a method. The method includes aligning an aperture of an alignment tool with a camera of a phone. A ferrous arc is selectively connected to a bottom surface of the alignment tool. The method includes applying pressure to the alignment tool to adhere the ferrous arc to a back of the phone. The method includes connecting a first body to the ferrous arc, wherein the ferrous arc is positioned within a recess of a bottom of the first body. The method includes positioning an optical device on a surface of a second body, wherein the second body is movably connected to the first body. The method includes adjusting a strap connected to the first body to secure the optical device against the second body. The method may include aligning the optical device with the camera by moving the second body with respect to the first body.

BRIEF DESCRIPTION OF THE DRAWINGS

FIG. 2 is a schematic of an embodiment of an alignment tool.

FIG. 3 is a schematic of an embodiment of an alignment tool positioned on the back of a phone.

FIG. 4 is a schematic of an embodiment of a portion of an alignment tool connected to the back of a phone.

Figure 1:
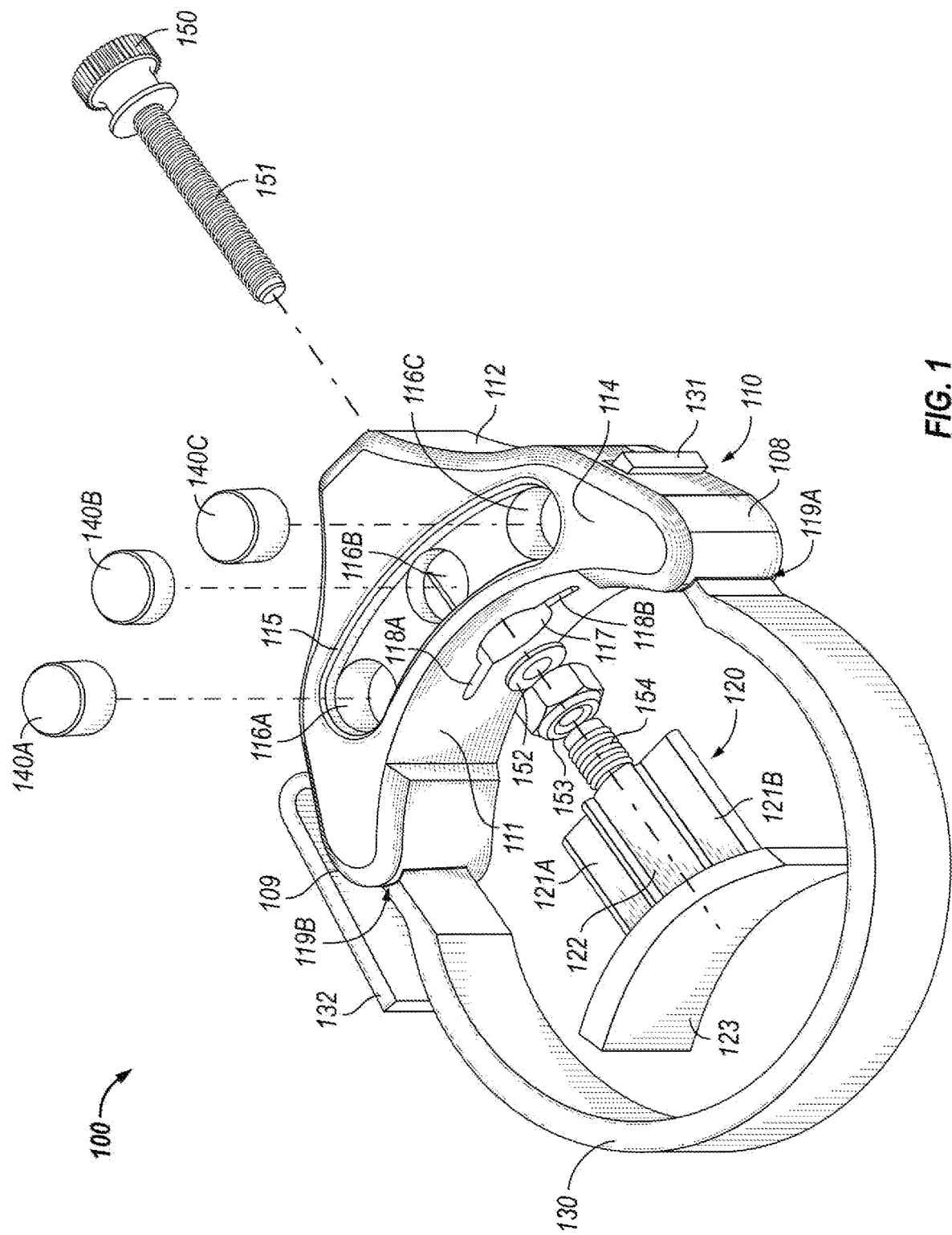
FIG. 1 is a schematic of an embodiment of an optic attachment device.

While the disclosure is susceptible to various modifications and alternative forms, specific examples have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

This disclosure is directed to a device to help align smart phones and the like with high end optics including, but not limited to, binoculars, spotting scopes, or the like. The mechanisms within the system help account for varying eye relief distances, account for a wide range of eye piece diameters, and allows for a quick mount-dismount of the camera with a minimally obstructive semi-permanent fixture present on the camera. The apparatus, systems, and methods disclosed herein provide for a quick, rigid, and aligned mount for a variety of differently sized optics using an off the shelf phone case or phone. The apparatus, systems, and method disclosed herein provide for the repeatable attachment of such optical devices to a phone without the need to require a bulky case or bulky mechanisms.

FIG. 1 shows an embodiment of an optic attachment apparatus 100. The apparatus 100 includes a first body 110 that has an arcuate shape. The first body 110 has an inner side 111, an outer side 112 opposite the inner side 111, a top 113 (best shown in FIG. 5), and a bottom 114 opposite of the top 113, a first end 108, and a second end 109 opposite of the first end 108. The bottom 114 includes a first recess 115 and at least a second recess 116A positioned within the first recess 115 and a magnet 140A positioned within the second recess 116A. The first body 110 may include more than one second recesses 116A, 116B, 116C within the first recess 115 as would be appreciated by one of ordinary skill in the art having the benefit of this disclosure. For example, the first body 110 of the apparatus 100 may include a third recess 116B positioned within the first recess 115 and a second magnet 140B positioned within the third recess 116B. The first body 110 of the apparatus 100 may include a fourth recess 116C positioned within the first recess 116 and a third magnet 140C positioned within the fourth recess 116C.

The apparatus 100 includes a second body 120 movably connected to the inner side 111 of the first body 110. A portion 123 of the second body 120 may have an arcuate shape. The second body 120 is configured to be movable inwards and outwards with respect to the inner side 111 of the first body 110. The apparatus 100 includes a strap 130 having a first end 131 and a second end 132. A first portion 133 (best shown in FIG. 6) of the strap 130 is selectively connected to the first body 110 and a second portion 134 (best shown in FIG. 6) is selectively connected to the first body 110. The strap forms an arc from the inner surface 111 of the first body 110. The radius of the arc may be adjusted by the second portion 134 that is selectively connected to the first body 110. For example, the second end 132 may be pulled farther from the first body 110 to move the second portion 134 farther along the strap 130 to decrease the radius of the arc. As discussed above, the apparatus 100 includes at least one magnet 140A, 140B, 140C positioned within a recess 116A, 116B, 116C within the first recess 115. The apparatus 100 may include one, two, three, or more magnets 140A, 140B, 140C each positioned within one of the second recesses 116A, 116B, 116C as would be appreciated by one of ordinary skill in the art having the benefit of this disclosure. The first recess 115 is configured to correspond with a ferrous arc 220 (shown in FIGS. 2-4) that is connected to the back of a phone as discussed herein. The one or more magnets 140 selectively connect the apparatus 100 to the ferrous arc 220 as discussed herein.

The second body 120 of the apparatus 100 includes a post 122 that extends from the second body 120 toward the first body 110. The first body 110 of the apparatus 100 includes a central aperture 117 that extends through the first body 110 from the inner side 111 to the outer side 112. The first body 110 includes a first slot 118A connected to the central aperture 117. The first slot 118A extends through at least a portion of the first body 110. The first body includes a second slot 118B connected to the central aperture 117. The second slot 118B extends through at least a portion of the first 110. The central aperture 117 is positioned between the first slot 118A and the second slot 118B. A central portion of the post 122 is positioned within the central aperture 117 of the first body 110. A first portion 121A of the post 122 of the second body 120 is positioned within the first slot 118A. A second portion 121B of the post 122 of the second body 120 is positioned within the second slot 118B.

The apparatus includes a screw 150 that may be selectively connected to the second body 120. The screw includes threads 151 that may be threaded into a nut 153 and a threaded insert 154 that is connected to the second body 120. The apparatus includes a washer 152 positioned between the nut 153 and the head of the screw 150. The screw 150 may be a thumb screw. The screw 150 is positioned within the central aperture 117 of the first body 110. The rotation of the screw 150 adjusts the position of the second body 120 relative to the inner surface, or side, 111 of the first body 110 as would be appreciated by one of ordinary skill in the art having the benefit of this disclosure.

The first body 110 of the apparatus 100 may include a first slot 119A through the first body 110 and a second slot 119B through the first body 110. The first and second slots 119A, 119B are configured to secure the strap 130 to the first body 110. A first portion 133 of the strap 130 passes through a first portion of the first body 110 to secure the first end 131 of the strap 130 to the first body 110. A second portion 134 of the strap 130 passes through a second portion of the first body 110 to secure the second end 132, or a portion adjacent to the second end 132, of the strap 130 to the first body 110.

FIG. 2 shows an embodiment of an alignment tool 200. To ensure consistent placement and use of the apparatus 100 with the camera of a phone, an aligning fixture, or tool, 200 is used for the initial placement of a semi-permanent ferrous steel piece 220 onto the back of a phone as discussed herein. The semi-permanent ferrous steel piece, also referred to as a ferrous element, a steel piece, a metallic, magnetic, or ferrous arc, 220 is precision cut to align within a mating portion (e.g., first recess 115) of the apparatus 100 that may be used to connect to an optical device. Adhesive may be used to connect the ferrous, or metallic, arc 220 to the back of a phone. For example, high strength double sided sticky tape may be used to connect the ferrous arc 220 to a phone or phone case. Other mechanisms may be used to fasten the steel piece to the phone case as would be appreciated by one of ordinary skill in the art having the benefit of this disclosure.

The alignment tool 200 includes a top surface 201 (best shown in FIG. 3) and a bottom surface 202. The magnetic (i.e., ferrous) arc or element 220 is placed in the alignment tool 200 and may be adhered flush with the bottom side 202 of the alignment tool 200. The ferrous arc 220 may have a slight offset from the top surface 201 (shown in FIG. 3). The ferrous arc 220 includes an adhesive 221 that enables the ferrous arc 220 to be selectively connected to a device to capture pictures. For example, the adhesive 221 enables the arc 220 to be selectively connected to the surface of a phone, phone case, or the like as discussed herein.

FIG. 3 shows the alignment tool 200 positioned on the back 302 of a phone 300 with the top surface 201 of the alignment tool 200 positioned away from the back 302 of the phone 300. The alignment tool 200 may be used on the back of the phone 300 or back of a phone case as would be appreciated by one or ordinary skill in the art having the benefit of this disclosure. The alignment tool, or jig, 200 includes an aperture 210. The phone's camera app may be used to center the aperture 210 of the alignment tool 200 the camera 310 (shown in FIG. 4) in the phone 300. The alignment of the aperture 210 may be done by maneuvering the alignment tool 200 around the back side 302 of the phone 300 until the aperture 210 appears centered in the screen of the phone 300. Preferably, one should try to ensure that the ferrous arc 220 has the maximum amount of surface area on the back 302 of the phone for the adhesive 221 to adhere to. Once the magnetic (i.e., ferrous) element 220 is positioned over the case in an optimal position with the center of the aperture 210 over the camera 310, the ferrous arc 220 is then depressed towards the phone 300, or phone case, causing the adhesive to adhere to selectively connect the ferrous arc 220 to the back 302 of the phone 300.

FIG. 4 shows the ferrous element, or arc, 220 connected to the back 302 of the phone 300. The ferrous arc 220 has a shape, or perimeter, 222 that corresponds to the shape, or perimeter, of the first recess 115 of the apparatus 100 used to connect an optical device to the phone 300 with proper alignment as discussed herein.

Figure 5:
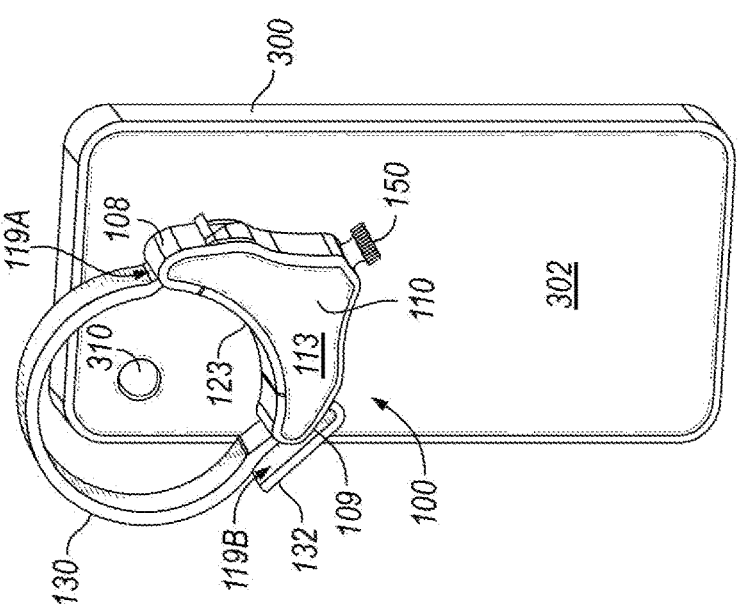
FIG. 5 is a schematic of an embodiment of an optic attachment device selectively connected to the back of a phone.

FIG. 5 shows the optic attachment apparatus 100 selectively connected to the back 302 of a phone 300. The magnets 140A, 140B, 140C selectively connect the apparatus 100 to the ferrous arc 220, which is connected to the back 302 of the phone 300. The magnets 140A, 140B, 140C may be press-fit into the recesses 116A, 116B, 116C of the first body 110, which may be comprised of plastic. The first recess 115 in the first body 110 is configured (i.e., shaped) to accept, or receive, the ferrous arc 220 attached to the phone 300. The magnetic connection enables the ease of removal and attachment of the optical attachment apparatus without any racking or twisting. This may ensure that the camera of the phone will always have a linear offset from the center of any diameter optic, which tightening or loosening by the movement of the second body 120 will account for. As discussed above, the screw 150 may be twisted to move the second body 120.

The attachment apparatus 100 provides for different optical devices to be used with a phone. For example, a user may be able to attach an optical device with a 45 mm diameter eyepiece with the camera using the alignment tool 200 to place the ferrous arc 220 and then using the attachment apparatus 100 magnetically connected to the ferrous arc 220. An optical device having a 45 mm diameter will require that the phone's camera be positioned 22.5 mm from the outer edge of the lens. After attaching the optical device to the apparatus 100, the screw 150 may be rotated to adjust the positioned of the camera over the lens in a linear direction. The strap 130 may be used to secure the optical device to the apparatus 100. If the user would then like to use a larger optical device, the screw 150 may be used to move the second body 120 toward the first body 110 to increase the radial distance from the outer edge of the optic to the center of the camera 310.

Figure 6:
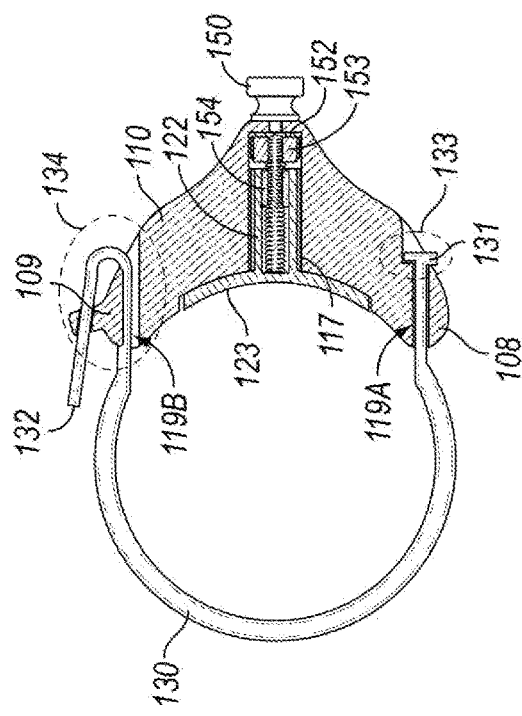
FIG. 6 is a cross-sectional schematic of an embodiment an optic attachment device.
Figure 7:
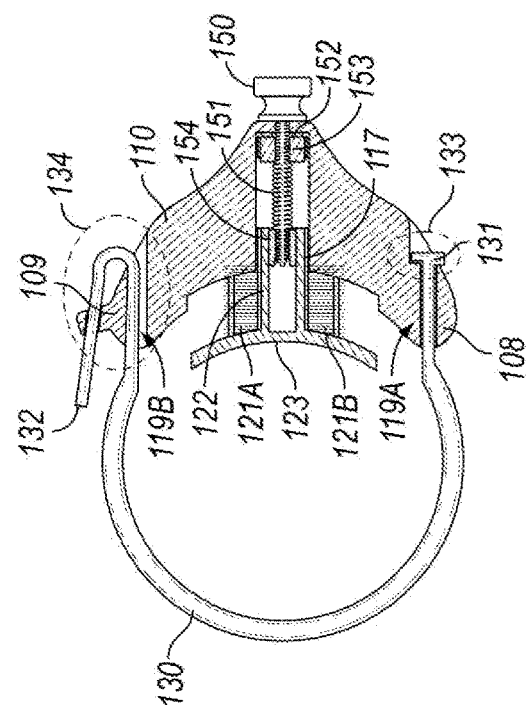
FIG. 7 is a cross-sectional schematic of an embodiment an optic attachment device.

FIGS. 6 and 7 are cross-sectional views of the apparatus 100. FIG. 6 shows the second body 120 positioned adjacent to the first body 110. FIG. 7 shows the second body 120 moved away a distance from the first body 110. A first portion 133 of the strap 130 is positioned through a first slot 119A of the first body 110 to secure the first end 131 of the strap 130 to the first end 108 of the first body 110. A second portion 134 of the strap adjacent to the second end 132 of the strap 130 passes through a second slot 119B of the first body 110 to secure the strap 130 to the second end 109 of the first body 110. The length of the strap 130 may be adjusted to secure optical devices having various outer diameters to the apparatus 100 as would be appreciated by one of ordinary skill in the art having the benefit of this disclosure.

Figure 8:
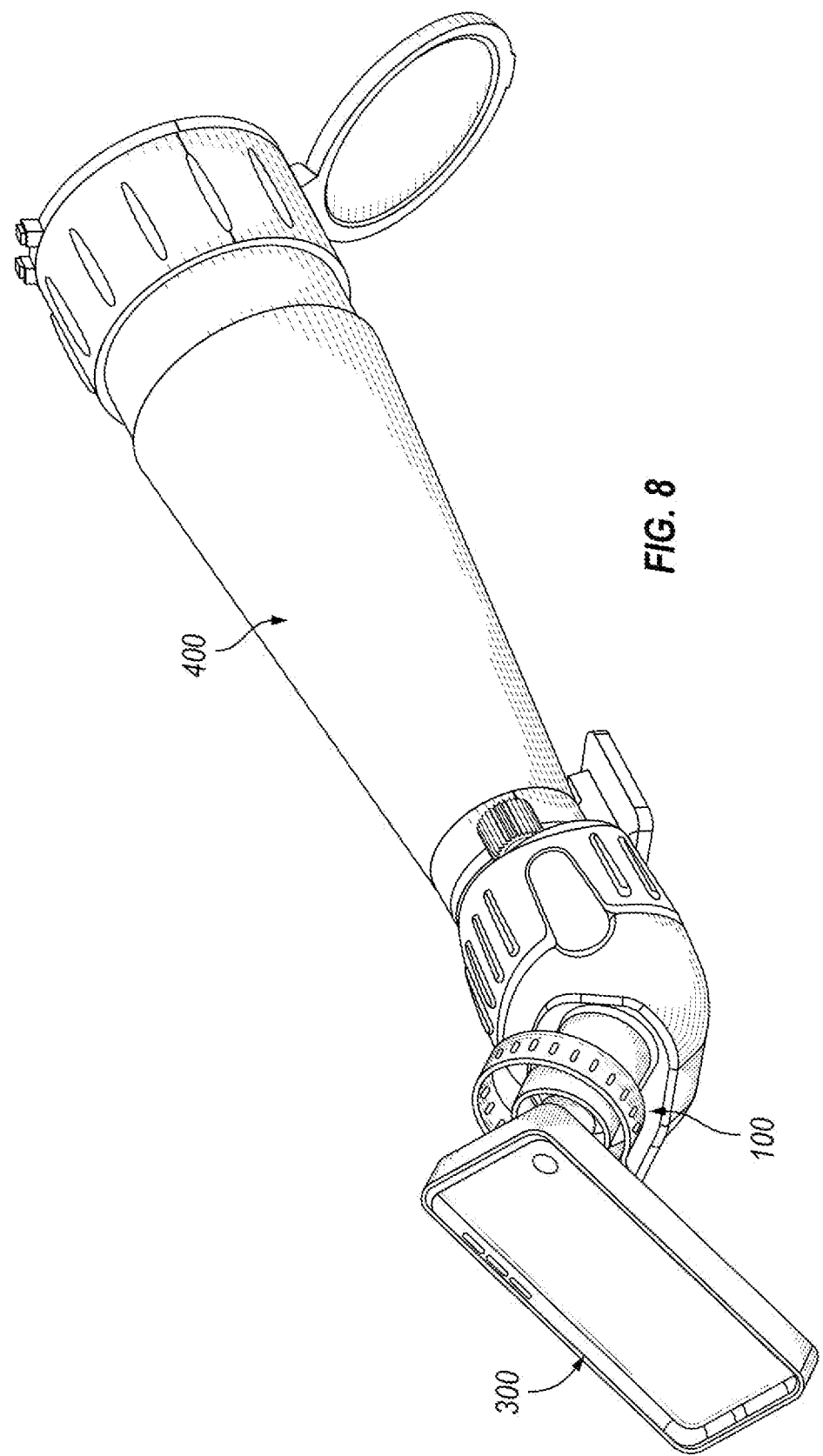
FIG. 8 is a schematic showing an optical device connected to a phone via an embodiment of an optic attachment device.

FIG. 8 shows an optical device 400 connected to a phone 300 via an optic attachment apparatus 100. As disclosed herein, the apparatus 100 includes a second body 120 (not visible in FIG. 8) that may be moved within respect to a first body 110 to center or align the optical device 400 with the camera 310 of the phone 300 as discussed herein. A strap 130 of the apparatus 100 may be used to secure the optical device 400 to the attachment apparatus 100. The strap 130 of the apparatus 100 may be comprised of an elastic material to enable the user to pull on the strap 130 to provide a desired tension to secure the optical device to the apparatus 100 as would be appreciated by one of ordinary skill in the art having the benefit of this disclosure.

Figure 9:
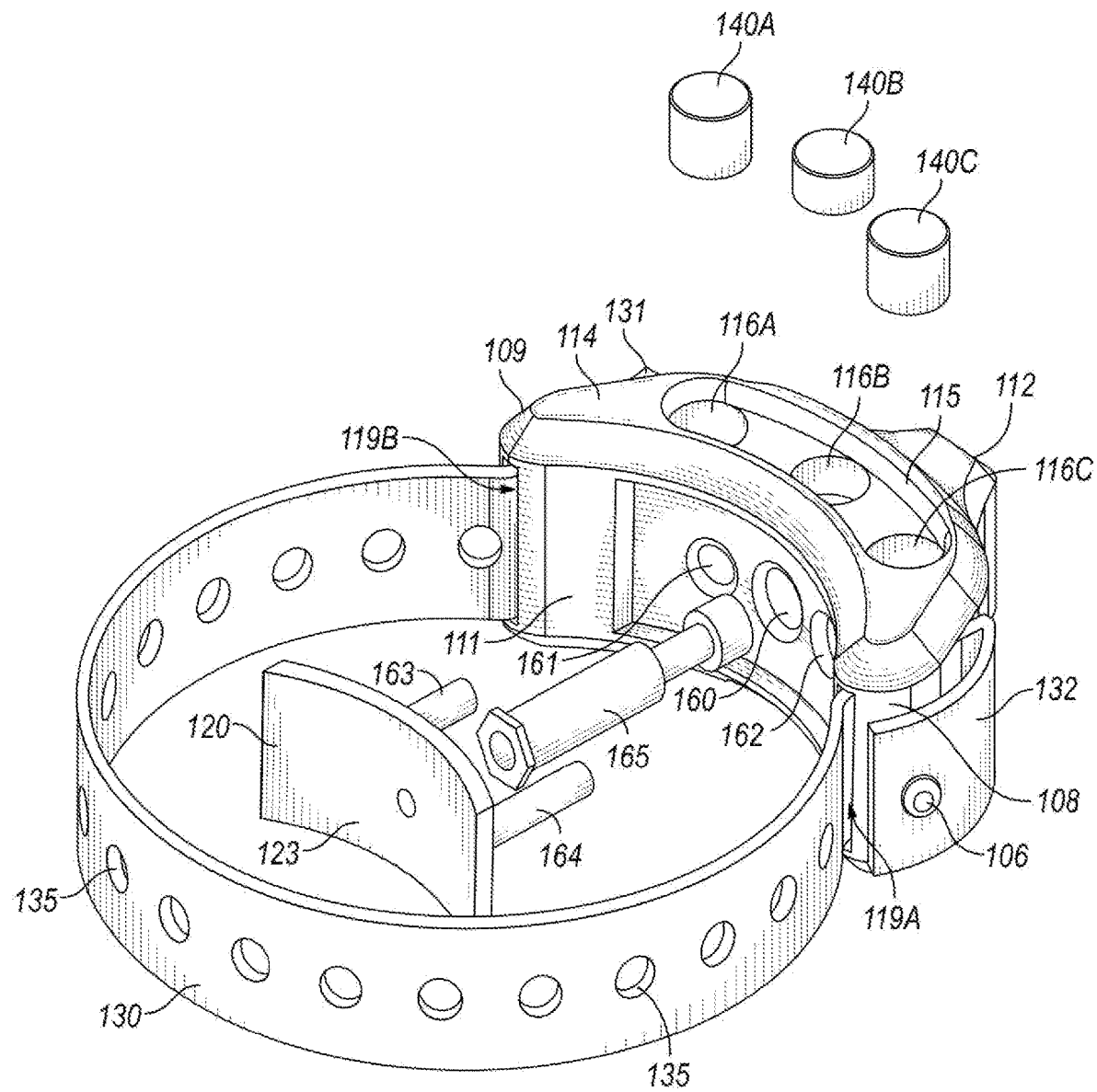
FIG. 9 is a schematic showing an embodiment of an optic attachment device.
Figure 10:
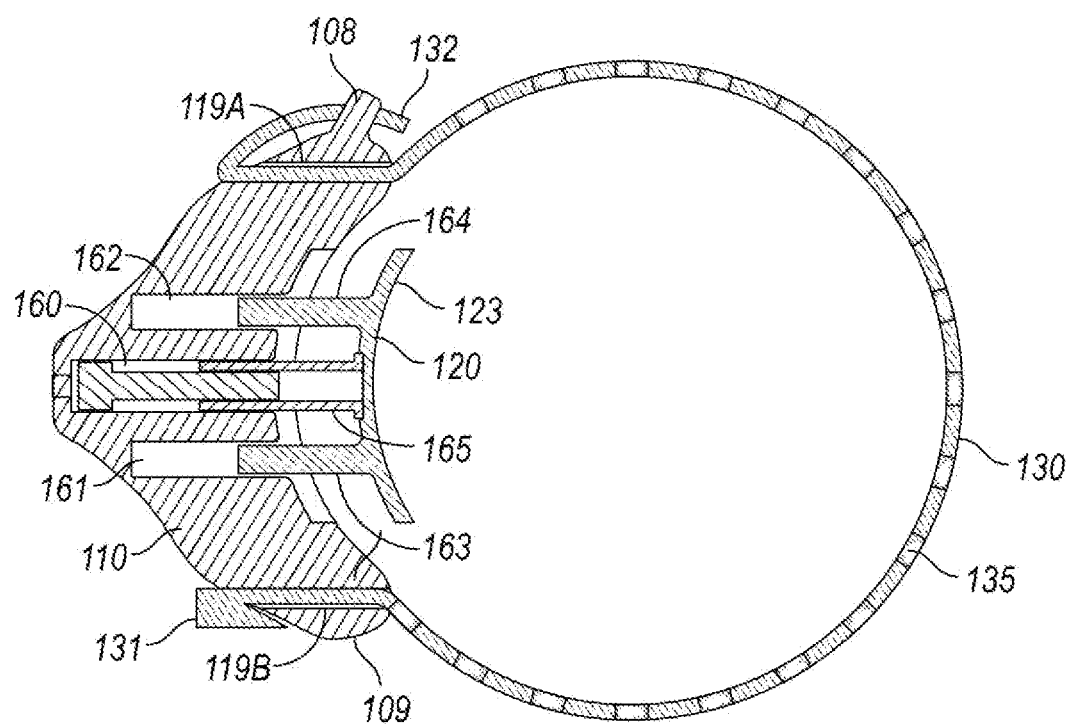
FIG. 10 is a cross-sectional schematic of an embodiment of an optic attachment device.
Figure 11:
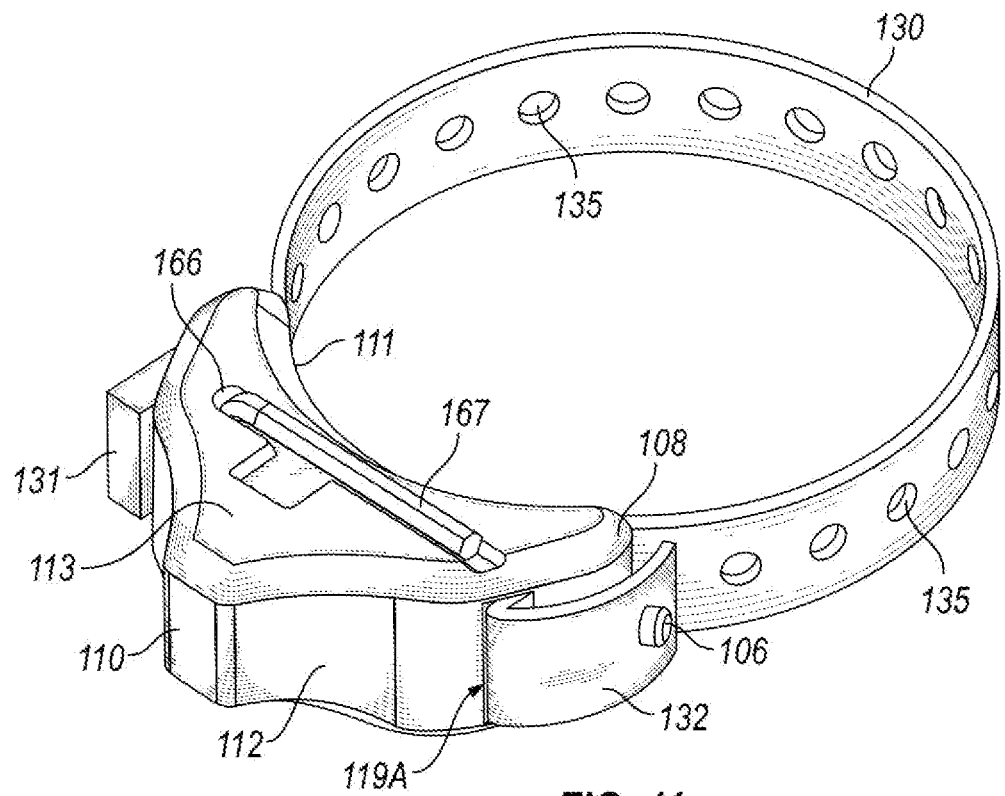
FIG. 11 is a schematic of an embodiment of an optic attachment device.

FIGS. 9-11 show an embodiment of an optic attachment apparatus 100. The apparatus 100 includes a first body 110 that has an arcuate shape. The first body 110 has an inner side 111, an outer side 112 opposite the inner side 111, a top 113, and a bottom 114 opposite of the top 113, a first end 108, and a second end 109 opposite of the first end 108. The bottom 114 includes a first recess 115 and at least a second recess 116A positioned within the first recess 115 and a magnet 140A positioned within the second recess 116A. The first body 110 may include more than one second recesses 116A, 116B, 116C within the first recess 115 as would be appreciated by one of ordinary skill in the art having the benefit of this disclosure. For example, the first body 110 of the apparatus 100 may include a third recess 116B positioned within the first recess 115 and a second magnet 140B positioned within the third recess 116B. The first body 110 of the apparatus 100 may include a fourth recess 116C positioned within the first recess 116 and a third magnet 140C positioned within the fourth recess 116C.

The apparatus 100 includes a second body 120 movably connected to the inner side 111 of the first body 110. A portion 123 of the second body 120 may have an arcuate shape. The second body 120 is configured to be movable inwards and outwards with respect to the inner side 111 of the first body 110. The apparatus 100 includes a strap 130 having a first end 131 and a second end 132. The strap 130 includes a plurality of holes or openings 135. The openings 135 may be used to secure the strap 130 to the first body 110. The shape of the openings 135 may be varied as would be appreciated by one of ordinary skill in the art having the benefit of this disclosure. For example, the openings 135 may be slots, circular openings, or the like.

The strap 130 is selectively connected to the first end 108 of the first body 110 and is selectively connected to the second end 109 of the first body 110. For example, the first end 108 of the first body 110 may include a first post 106 that may be positioned through one of the openings 135 in the strap 130. The second end of the strap 130 may be secured to the second end 109 of the first body 110 via a slot 119B in the first body 110. The strap forms an arc from the inner surface 111 of the first body 110. The radius of the arc may be adjusted by the second portion of the strap 130 that is selectively connected to the first body 110. For example, the second end 132 may be pulled farther from the first body 110 to move the second portion farther along the strap 130 to decrease the radius of the art. As discussed above, the apparatus 100 includes at least one magnet 140A, 140B, 140C positioned within a recess 116A, 116B, 116C within the first recess 115. The apparatus 100 may include one, two, three, or more magnets 140A, 140B, 140C each positioned within one of the second recesses 116A, 116B, 116C as would be appreciated by one of ordinary skill in the art having the benefit of this disclosure. The first recess 115 is configured to correspond with a ferrous arc 220 (shown in FIGS. 2-4) that is connected to the back of a phone as discussed herein. The one or more magnets 140 selectively connect the apparatus 100 to the ferrous arc 220 as discussed herein.

The second body 120 of the apparatus 100 include a first post 163 that extends from the second body 120 toward the first body 110 and a second post 164 that extends from the second body 120 toward the first body 110. The first body 110 of the apparatus 100 includes a central aperture 160 that extends through the first body 110 from the inner side 111 to the outer side 112. The first body 110 also includes a first aperture 161 that extends through the first body 110 from the inner side 111 to the outer side 112. The first body 110 includes a second aperture 162 that extends through the first body 110 from the inner side 111 to the outer side 112. The central aperture 160 is positioned between the first aperture 161 and the second aperture 162. A portion of the first post 163 of the second body 120 is positioned within the first aperture 161 of the first body 110. A portion of the second post 164 of the second body 120 is positioned within the second aperture 162 of the first body 110.

The apparatus 100 includes a screw 165 that may be selectively connected to the second body 120. The screw 165 is positioned within the central aperture 160 of the first body 110. The rotation of the screw 165 adjusts the position of the second body, or member, 120 relative to the inner surface, or side, 111 of the first body 110 as would be appreciated by one of ordinary skill in the art having the benefit of this disclosure.

The first body 110 of the apparatus 100 may include a first slot 119A through the first body 110 and a second slot 119B through the first body 110. The first and second slots 119A, 119B are configured to secure the strap 130 to the first body 110. A first portion of the strap 130 passes through a first portion of the first body 110 to secure the first end 131 of the strap 130 to the first body 110. A second portion of the strap 130 passes through a second portion of the first body 110 to secure the second end 132, or a portion adjacent to the second end 132, of the strap 130 to the first body 110. The strap 130 may pass around a portion of the first body 110 rather than traveling through the first body 110 to secure the strap 130 to the first body 110 as would be appreciated by one of ordinary skill in the art having the benefit of this disclosure.

The first body 110 may include a fifth recess 166 located in the top surface 113 of the first body 110. The fifth recess 166 is shaped to hold a hex key 167. The hex key 167 may be removed from the fifth recess 166 and used to rotate the screw 165 to move the second member toward or away from the first member 110.

Figure 12:
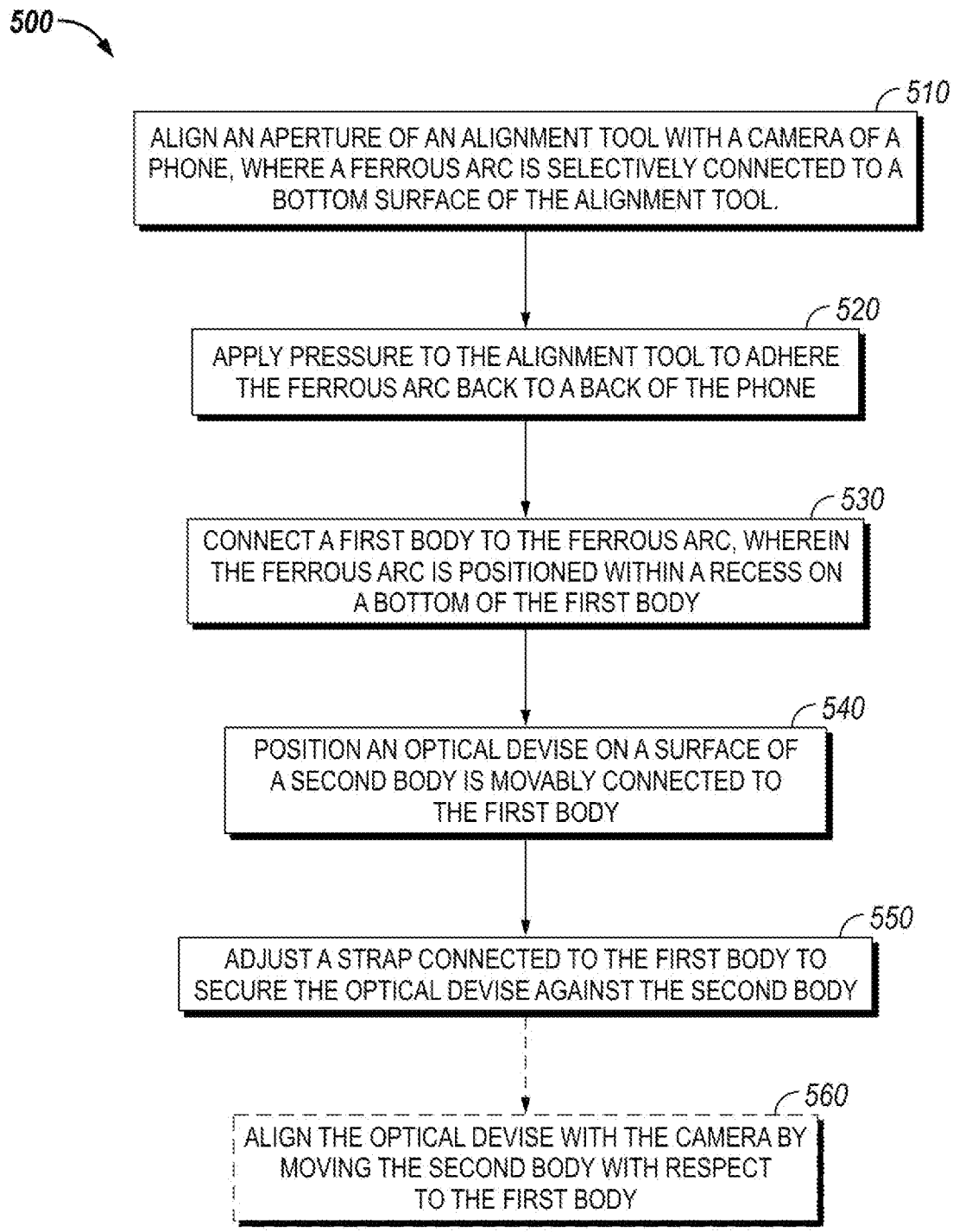
FIG. 12 is a flow chart depicting one embodiment of a method of the present disclosure.

FIG. 12 is a flow chart of an embodiment of a method 500 in accordance with the present disclosure. The method 500 includes aligning an aperture of an alignment tool with a camera of a phone, wherein a ferrous arc is selectively connected to a bottom surface of the alignment tool, at 510. For example, a phone's camera app may be used to center the aperture 210 of the alignment tool 200 the camera 310 of a phone 300. The alignment of the aperture 210 may be done by maneuvering the alignment tool 200 around the back side 302 of the phone 300 until the aperture 210 appears centered in the screen of the phone 300.

The method 500 includes applying pressure of the alignment tool to adhere the ferrous arc to a back of the phone, at 520. For example, once the magnetic (i.e., ferrous) element 220 is positioned over the case in an optimal position with the center of the aperture 210 over the camera 310, the ferrous arc 220 is then depressed towards the phone 300, or phone case, causing the adhesive to adhere to selectively connect the ferrous arc 220 to the back 302 of the phone 300.

The method 500 includes connecting a first body to the ferrous arc, wherein the ferrous arc is positioned within a recess on a bottom of the first body, at 530. For example, the first recess 115 in the first body 110 is configured (i.e., shaped) to accept, or receive, the ferrous arc 220 attached to the phone 300. The method 500 optionally includes positioning an optical device on a surface of a second body, wherein the second body is movably connected to the first body, at 540. The method 500 includes adjusting a strap connected to the first body to secure the optical device against the second body, at 550. The radius of the arc may be adjusted by the second portion of the strap 130 that is selectively connected to the first body 110. For example, the second end 132 may be pulled farther from the first body 110 to move the second portion farther along the strap 130 to decrease the radius of the art.

The method 500 may include aligning the optical device with the camera by moving the second body with respect to the first body, at 560. For example, after attaching the optical device to the apparatus 100, the screw 150 may be rotated to adjust the positioned of the camera over the lens in a linear direction Although various examples have been shown and described, the present disclosure is not so limited and will be understood to include all such modifications and variations as would be apparent to one skilled in the art.

What is claimed is:

1. An apparatus comprising:
a first body having an arcuate shape, the first body having an inner side, an outer side opposite the inner side, a top, and a bottom opposite of the top, a first end, and a second end opposite of the first end, the bottom including a first recess and a second recess positioned within the first recess;
a second body connected to the inner side of the first body, wherein the second body is configured to be movable inwards and outwards with respect to the inner side of the first body;
a strap having a first portion selectively connected to the first body and a second portion selectively connected to the first body, the strap forming an arc from the inner side of the first body, wherein a radius of the arc may be adjusted by second portion selectively connected to the first body; and
a magnet positioned within the second recess.

2. The apparatus of claim 1, further comprising a third recess positioned within the first recess and a second magnet positioned within the third recess.

3. The apparatus of claim 2, further comprising a fourth recess positioned within the first recess and a third magnet positioned within the fourth recess.

4. The apparatus of claim 1, wherein a portion of the second body has an arcuate shape.

5. The apparatus of claim 4, further comprising:
a first post that extends from the second body toward the first body;
a second post that extends from the second body toward the first body;
a central aperture that extends through the first body from the inner side to the outer side;
a first aperture that extends through the first body from the inner side to the outer side;
a second aperture that extends through the first body from the inner side to the outer side, wherein the central aperture is positioned between the first aperture and the second aperture;
wherein a portion of the first post of the second body is positioned with the first aperture of the first body; and
wherein a portion of the second post of the second body is positioned within the second aperture of the first body.

6. The apparatus of claim 5, further comprising a screw connected to the second body, the screw being positioned within the central aperture of the first body, wherein rotation of the screw adjusts a position of the second body relative to the inner side of the first body.

7. The apparatus of claim 6, further comprising a fifth recess located in the top of the first body.

8. The apparatus of claim 7, further comprising a hex key positioned within the first recess and wherein the hex key is configured to rotate the screw.

9. The apparatus of claim 4, further comprising:
a post that extends from the second body toward the first body;
a central aperture that extends through the first body from the inner side to the outer side;
a first slot connected to the central aperture, the first slot that extends through at least a portion of the first body;
a second slot connected to the central aperture, the second slot extends through at least a portion of the first body, wherein the central aperture is positioned between the first slot and the second slot;
wherein a central portion of the post of the second body is positioned within the central aperture of the first body;
wherein a first portion of the post of the second body is positioned within the first slot; and
wherein a second portion of the post of the second body is positioned within the second slot.

10. The apparatus of claim 9, further comprising a screw connected to the second body, the screw being positioned within the central aperture of the first body, wherein rotation of the screw adjusts the position of the second body relative to the inner side of the first body.

11. The apparatus of claim 1, further comprising an exterior post positioned on the second end of the first body and the strap further comprising a plurality of holes along a length of the strap, wherein the second portion of the strap is connected to the first body via the exterior post positioned within one of the plurality of holes.

12. The apparatus of claim 1, wherein the first portion of the strap passes through a first portion of the first body and wherein the second portion of the strap passes through a second portion of the first body.

13. The apparatus of claim 1, wherein the first portion of the strap passes around a first portion of the first body and wherein the second portion of the strap passes around a second portion of the first body.

14. A system comprising:
- an alignment tool having a top surface and a bottom surface opposite the top surface, the alignment tool comprising an alignment aperture through the alignment tool and a ferrous arc selectively connected to the bottom surface;
- an adhesive connected to the ferrous arc opposite of the alignment tool;
- a first body having an arcuate shape, the first body having an inner side, an outer side opposite the inner side, a top, and a bottom opposite of the top, a first end, and a second end opposite of the first end, the bottom including a first recess and a second recess positioned within the first recess;
- a second body connected to the inner side of the first body, wherein the second body is configured to be movable inwards and outwards with respect to the inner side of the first body;
- a strap having a first portion selectively connected to the first body and a second portion selectively connected to the body, the strap forming an arc from the inner side of the first body, wherein a radius of the arc may be adjusted by second portion selectively connected to the first body;
- a magnet positioned within the second recess; and
- wherein the alignment tool may be used to connect the ferrous arc to a phone and may be used to align the ferrous arc with respect to a camera of the phone.

15. The system of claim 14, further comprising a third recess positioned within the first recess, a second magnet positioned within the third recess, a fourth recess positioned within the first recess, and a third magnet positioned within the fourth recess.

16. The system of claim 15, wherein the second body has an arcuate shape and comprises a post that extends from the arcuate shape toward the first body.

17. The system of claim 16, wherein the first body includes a central aperture that extends through the first body from the inner side to the outer side, and wherein a portion of the post of the second body is positioned with the central aperture of the first body.

18. The apparatus of claim 17, further comprising a screw connected to the second body, the screw being positioned within the central aperture of the first body, wherein rotation of the screw adjusts the position of the second body relative to the inner side of the first body.

19. A method comprising:
- aligning an aperture of an alignment tool with a camera of a phone, wherein a ferrous arc is selectively connected to a bottom surface of the alignment tool;
- applying pressure to the alignment tool to adhere the ferrous arc to a back of the phone;
- connecting a first body to the ferrous arc, wherein the ferrous arc is positioned within a recess on a bottom of the first body;
- positioning an optical device on a surface of a second body, wherein the second body is movably connected to the first body; and
- adjusting a strap connected to the first body to secure the optical device against the second body.

20. The method of claim 19, further comprising aligning the optical device with the camera by moving the second body with respect to the first body.

* * * * *